United States Patent
Neufeld et al.

(10) Patent No.: US 8,746,434 B2
(45) Date of Patent: Jun. 10, 2014

(54) AGRICULTURAL CONVEYOR MANIPULATOR

(75) Inventors: Juan Neufeld, Winkler (CA); Bernie Thiessen, Winkler (CA)

(73) Assignee: Woodhaven Capitol Corp. (CA)

( * ) Notice: Subject to any disclaimer, the term of this patent is extended or adjusted under 35 U.S.C. 154(b) by 294 days.

(21) Appl. No.: 13/207,175

(22) Filed: Aug. 10, 2011

(65) Prior Publication Data

US 2012/0037058 A1     Feb. 16, 2012

Related U.S. Application Data

(60) Provisional application No. 61/372,156, filed on Aug. 10, 2010.

(51) Int. Cl.
 *B65G 21/10*     (2006.01)
(52) U.S. Cl.
 USPC ........................................... 198/312; 198/313
(58) Field of Classification Search
 USPC ........................ 198/312, 313, 315, 317, 319
 See application file for complete search history.

(56) References Cited

U.S. PATENT DOCUMENTS

| | | | | |
|---|---|---|---|---|
| 1,528,474 A | * | 3/1925 | French ........................... | 198/312 |
| 2,746,592 A | * | 5/1956 | Wilcoxen ...................... | 198/319 |
| 2,960,320 A | * | 11/1960 | Heider ........................... | 198/312 |
| 3,133,727 A | * | 5/1964 | Arthur ........................... | 198/312 |
| 3,232,354 A | | 2/1966 | Schlabs | |
| 4,166,351 A | | 9/1979 | Nienberg | |
| 4,503,803 A | * | 3/1985 | Barnes ........................... | 198/317 |
| 5,529,455 A | * | 6/1996 | Kaster et al. ................... | 198/317 |
| 5,577,563 A | | 11/1996 | Holen | |
| 5,623,885 A | | 4/1997 | Haag | |
| 5,655,872 A | * | 8/1997 | Plotkin .......................... | 198/313 |
| 5,687,798 A | | 11/1997 | Henry et al. | |
| 5,713,421 A | | 2/1998 | Skjaeveland | |
| 5,785,481 A | | 7/1998 | Ockels | |
| 5,819,950 A | * | 10/1998 | McCloskey .................... | 198/313 |
| 5,888,044 A | | 3/1999 | Baskerville | |
| 6,378,686 B1 | | 4/2002 | Mayer et al. | |
| 6,910,586 B2 | * | 6/2005 | McCloskey .................... | 198/313 |
| 6,964,551 B1 | | 11/2005 | Friesen | |
| 7,500,817 B2 | * | 3/2009 | Furrer et al. ................... | 198/312 |
| 2007/0102260 A1 | * | 5/2007 | Reimer et al. ................. | 198/313 |
| 2011/0318151 A1 | * | 12/2011 | Sheehan et al. ............... | 198/313 |

FOREIGN PATENT DOCUMENTS

| | | |
|---|---|---|
| CA | 1078194 A | 5/1980 |
| WO | WO2007094851 A2 | 8/2007 |
| WO | WO2007094851 A3 | 8/2007 |

* cited by examiner

*Primary Examiner* — James R Bidwell
(74) *Attorney, Agent, or Firm* — McKee, Voorhees & Sease, P.L.C.

(57) ABSTRACT

A manipulator is provided for the discharge conveyor of an agricultural seed cart. The manipulator allows the conveyor to be pivoted between a storage and transport position along the top of the cart and adjacent one side of the cart, and a use position extending from the rear of the cart. The manipulator also allows the conveyor to be swung approximately 180° to either side of the cart for discharge of seed to desired locations during use of the conveyor. The manipulator includes multiple actuators for the pivoting and sliding movement of the conveyor.

22 Claims, 21 Drawing Sheets

> US 8,746,434 B2

AGRICULTURAL CONVEYOR MANIPULATOR

CROSS-REFERENCE TO RELATED APPLICATIONS

This application claims priority under 35 U.S.C. §119 of a provisional application Ser. No. 61/372,156 filed Aug. 10, 2010, and which application is hereby incorporated by reference in its entirety.

BACKGROUND OF THE INVENTION

Conveyors are commonly used on agricultural carts, such as seed tenders and the like, for transferring seed or other particulate material from the cart to another container, such as bins on a planter. Generally, the cart has a tapered bottom wall leading to an outlet or discharge which feeds into the lower end of the conveyor. A manipulator is provided on the cart to move the conveyor between a transport or storage position and a use position. However, manipulation of the conveyor is typically limited to a single pivot axis, such that positioning of the conveyor is also limited.

Some prior art bulk seed trailers have conveyors which pivot between use and storage positions, and which also have limited additional pivoting while in use so as to adjust the location of the conveyor outlet. However, such prior art multi-axis conveyors generally do not fold compactly or require complex structure to achieve such pivotal action. Also, the storage position of some prior art conveyors blocks the cart inlet such that seed cannot be loaded into the cart while the conveyor is in the stored position.

Therefore, a primary objective of the present invention is the provision of an improved agricultural conveyor manipulator.

Another objective of the present invention is the provision of a manipulator for a seed cart conveyor which allows improved positioning of the conveyor.

Yet another objective of the present invention is the provision of an improved seed cart having a conveyor which can be moved from a transport position above the conveyor and adjacent one side of the conveyor so the seed can be loaded into the conveyor, and a use position behind the cart, with the lower hopper of the conveyer being aligned with the seed discharge of the cart.

A further objective of the present invention is the provision of a conveyor manipulator which allows sliding lateral movement of the conveyor and pivotal movement of the conveyor about vertical and horizontal axes.

Still another objective of the present invention is the provision of an improved bulk seed cart having a conveyor which allows the cart to be loaded with seed while the conveyor is in the storage position.

Another objective of the present invention is the provision of an improved agricultural seed cart having a conveyor which can swing approximately 180° for discharge to either side of the cart.

A further objective of the present invention is the provision of an improved agricultural seed cart wherein the conveyor is mounted on the rear end of the cart.

Another objective of the present invention is the provision of an improved agricultural seed cart having a conveyor which can be quickly and easily moved between storage and use positions.

Still another objective of the present invention is the provision of a slidable and pivotal conveyor for an agricultural seed cart which allows for compact storage of the conveyor over the seed cart and discharge of seed from the cart about a 180° radius.

A further objective of the present invention is the provision of a manipulator for a conveyor of an agricultural seed cart which is economically manufactured, durable, and easy to use.

These and other objectives will become apparent from the following description of the invention.

SUMMARY OF THE INVENTION

The conveyor manipulator of the present invention is intended for use on agricultural seed carts and other storage bins when particulate material is loaded into the cart and then discharged through a conveyor. The manipulator allows the conveyor to be moved between a transport or storage position located above the cart and toward one side, such that the cart can be loaded without interference while the conveyor is in the transport position. The manipulator also moves the conveyor to one or more use positions behind the trailer and/or to either side of the trailer. The manipulator includes multiple actuators to accommodate the movement of the conveyor between various use positions and to/from the storage position.

DETAILED DESCRIPTION OF THE PREFERRED EMBODIMENTS

Figure 1:
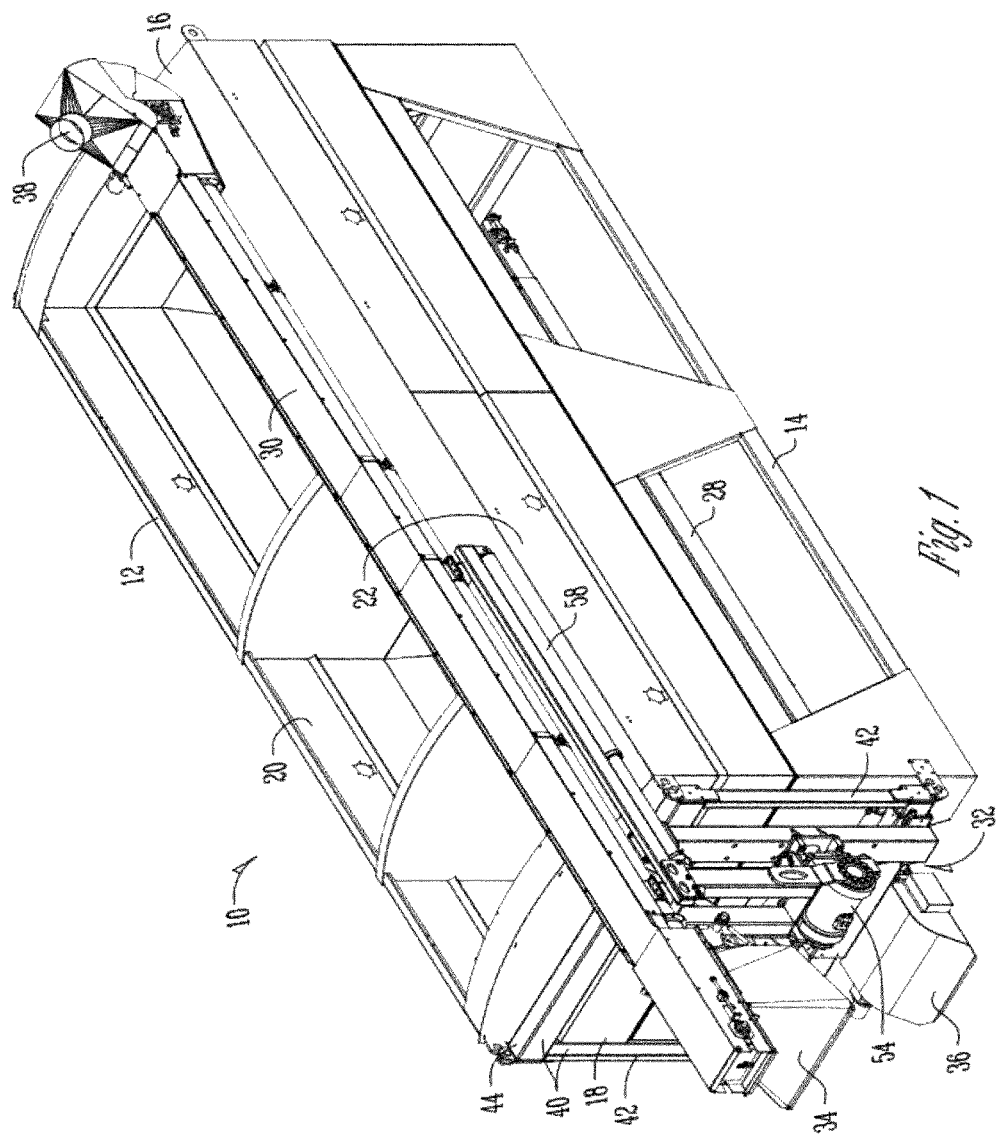
FIG. 1 is a perspective view of a seed cart with the conveyor in the transport position and having the conveyor manipulator of the present invention.
Figure 2:
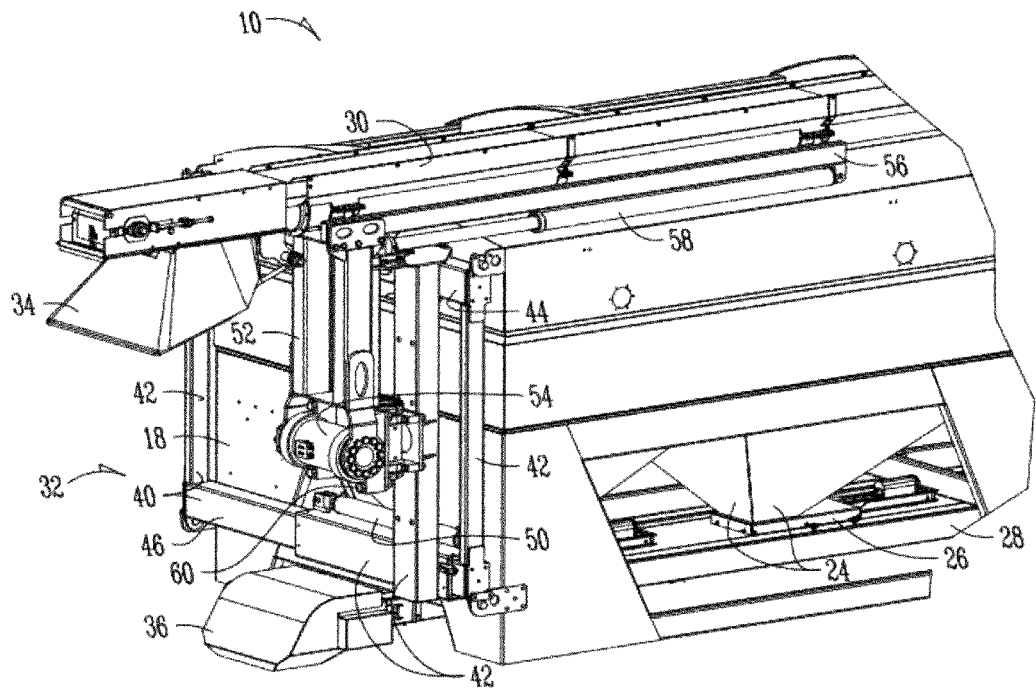
FIG. 2 is an enlarged perspective view of the rear end of the seed cart of FIG. 1.
Figure 3:
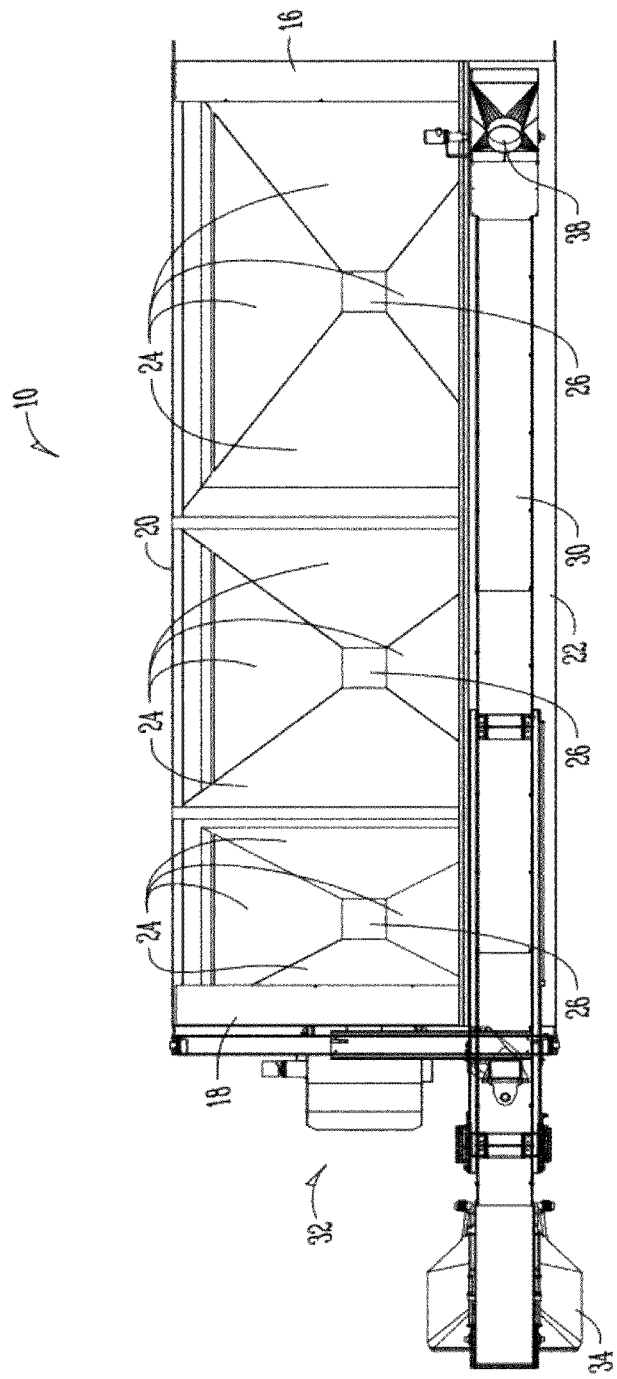
FIG. 3 is a top plan view of the seed cart of FIG. 1.
Figure 4:
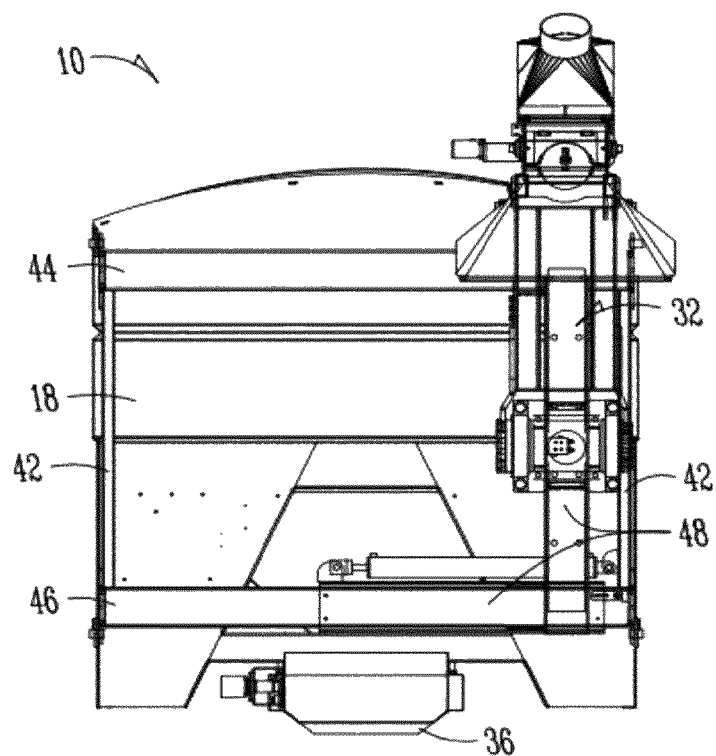
FIG. 4 is a rear end view of the seed cart of FIG. 1.
Figure 5:
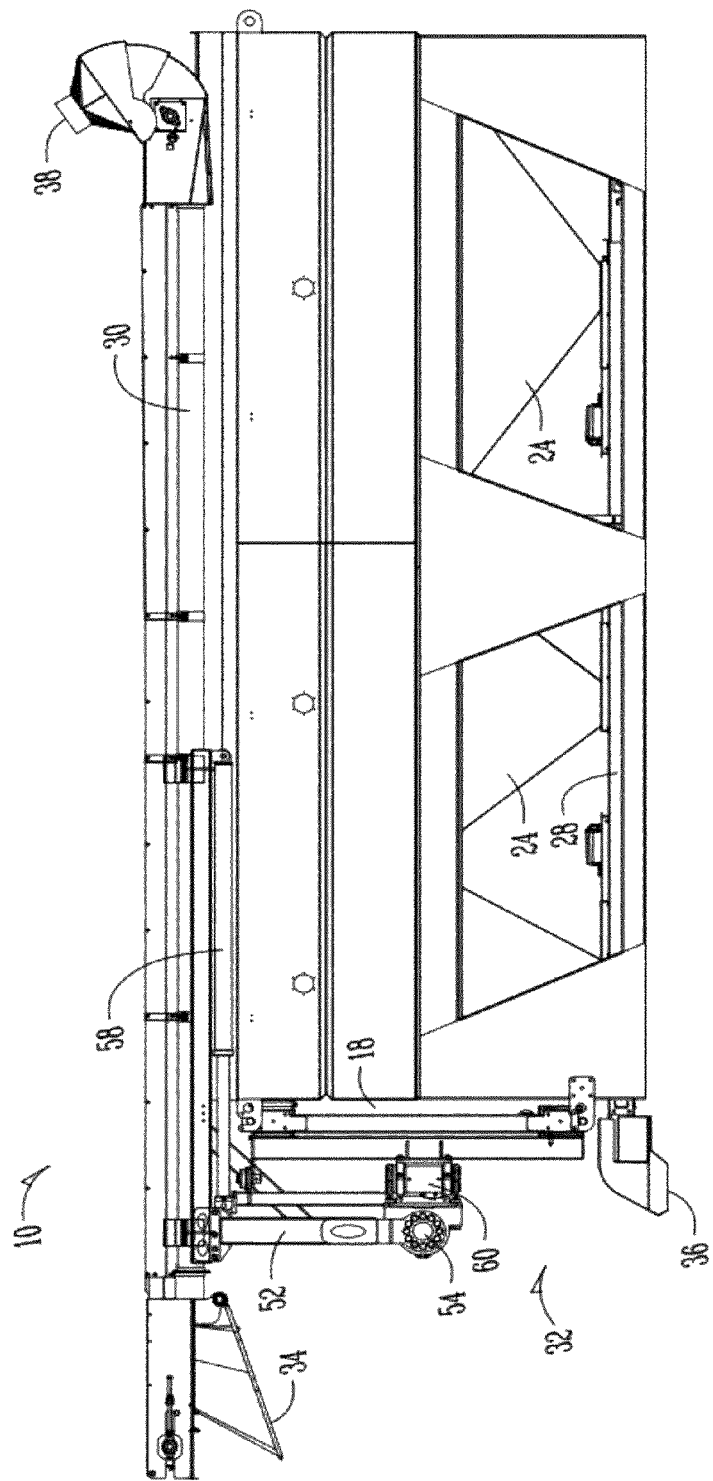
FIG. 5 is a side elevation view of the seed cart of FIG. 1.
Figure 6:
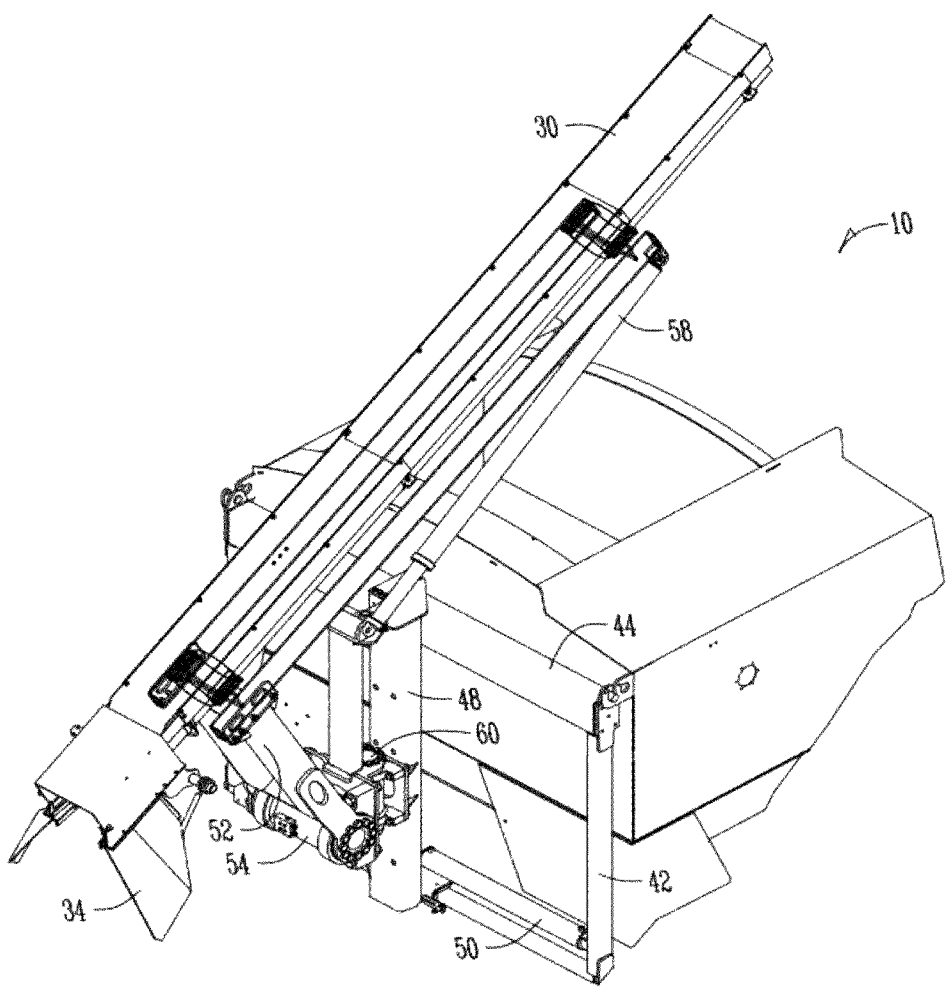
FIG. 6 is a perspective view of the rear end of the seed cart with the conveyor manipulated to a position between the transport position and the use position.
Figure 7:
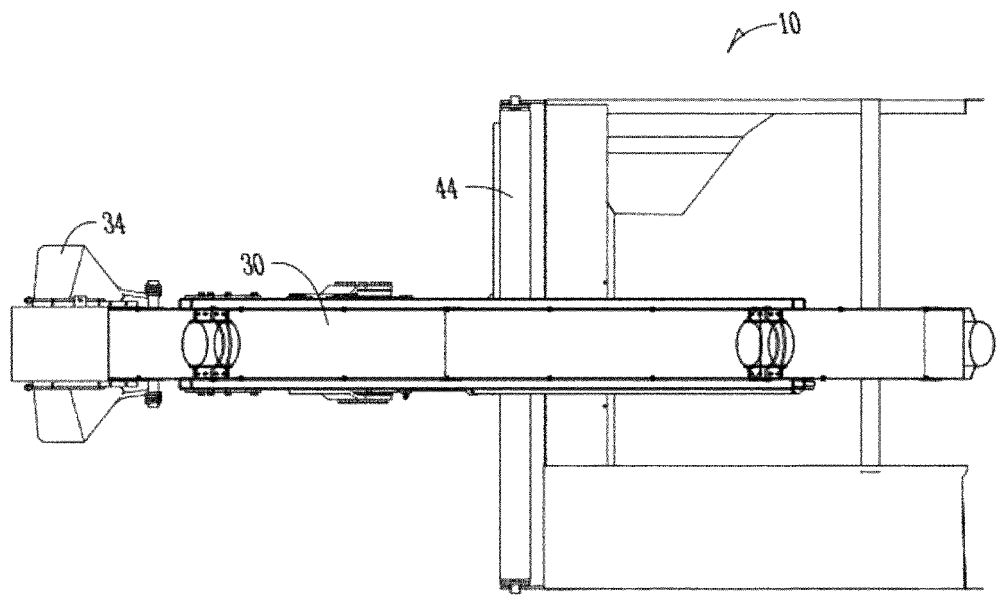
FIG. 7 is a top plan view of the conveyor of FIG. 6.
Figure 8:
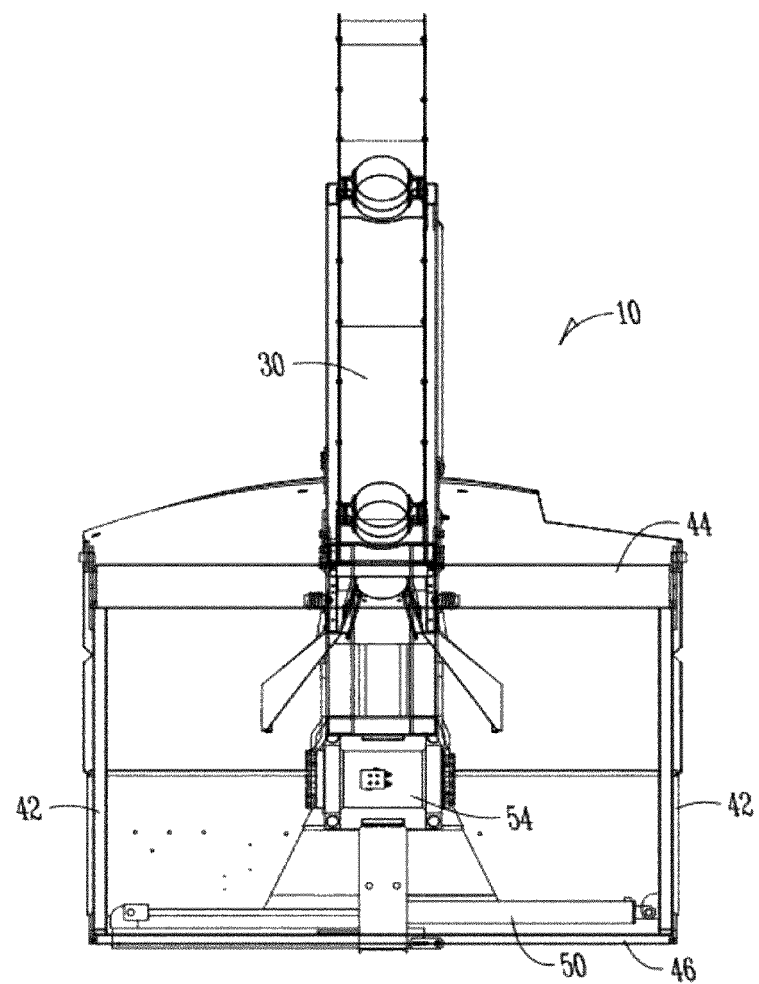
FIG. 8 is a rear end view of the conveyor of FIG. 6.
Figure 9:
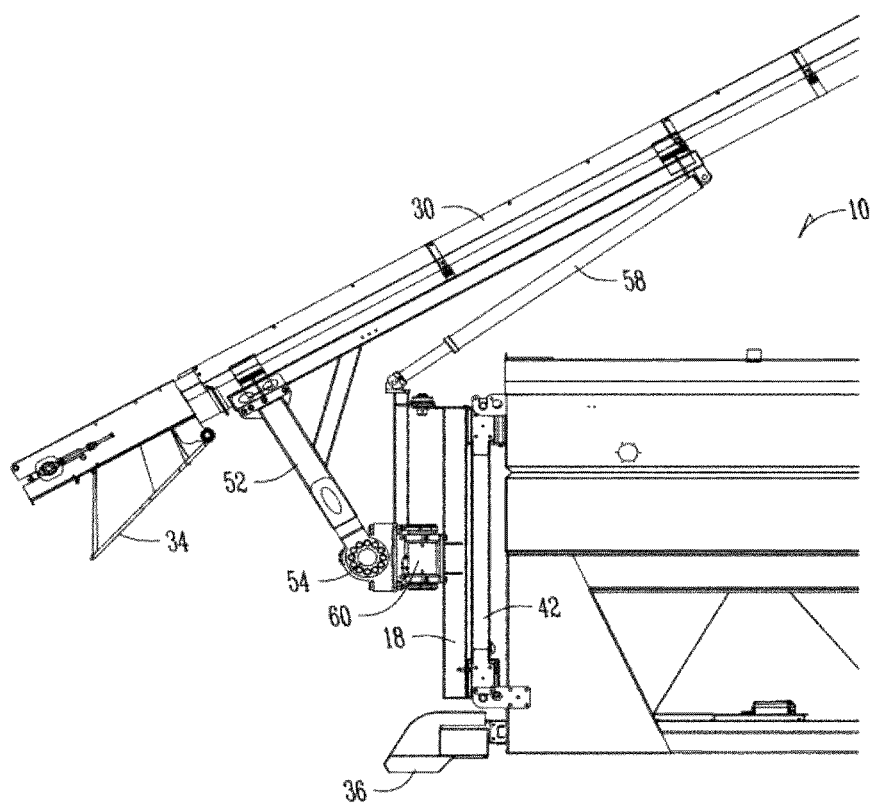
FIG. 9 is a side elevation view of the conveyor of FIG. 6.

A seed cart or tender is generally designated by the reference numeral 10 in the drawings. The cart 10 has a top 12, a bottom 14, a front end 16, a rear end 18, and opposite left and right sides 20, 22, respectively. As shown in FIG. 1, the top 12 of the cart 10 is open for loading seeds into the cart 10, although it is understood that the cart 10 may be covered, but have a seed inlet for loading the cart 10. The cart 10 generally includes sloped lower walls 24 which feed seed to one or more seed outlets or discharges 26. The cart 10 in FIG. 1 is elongated, and has a lower conveyor 28 for receiving seed from the cart bins, with the conveyor 28 carrying the discharged seed to the rear end 18 of the cart 10. The cart 10 may have various forms, different from those shown in FIG. 1, all of which are conventional and not part of the present invention.

Figure 10:
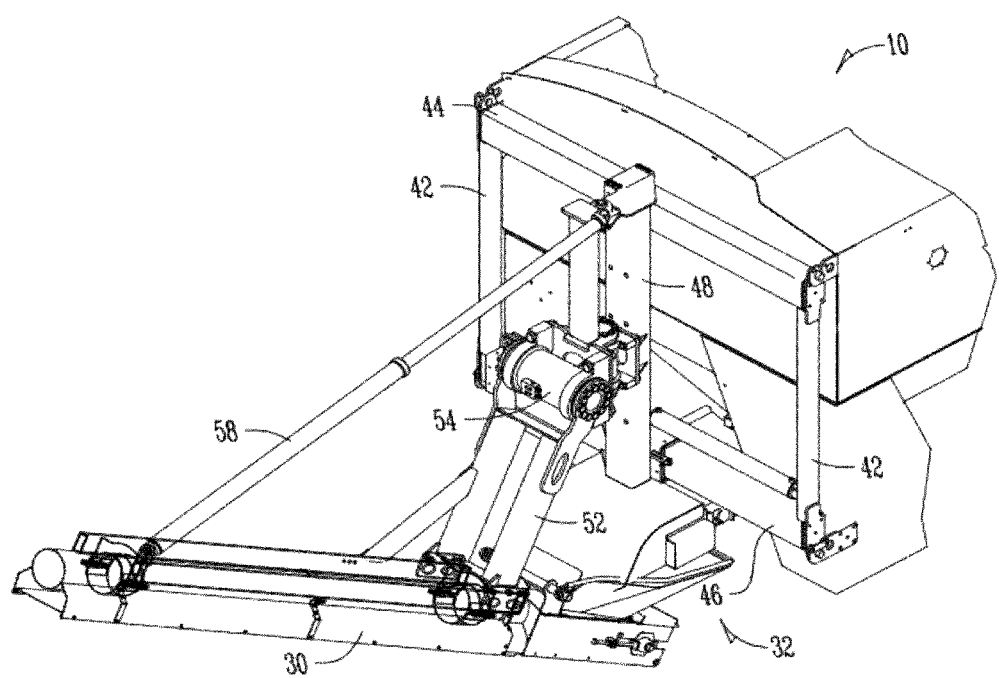
FIG. 10 is a perspective view of the seed cart with the seed cart manipulated to a use position according to the present invention.
Figure 11:
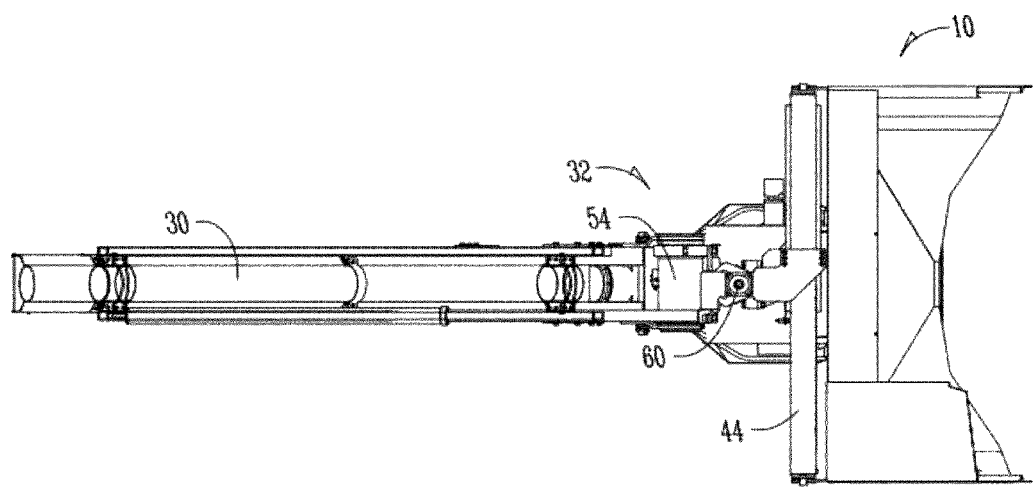
FIG. 11 is a top plan view of the seed cart shown in FIG. 10.
Figure 12:
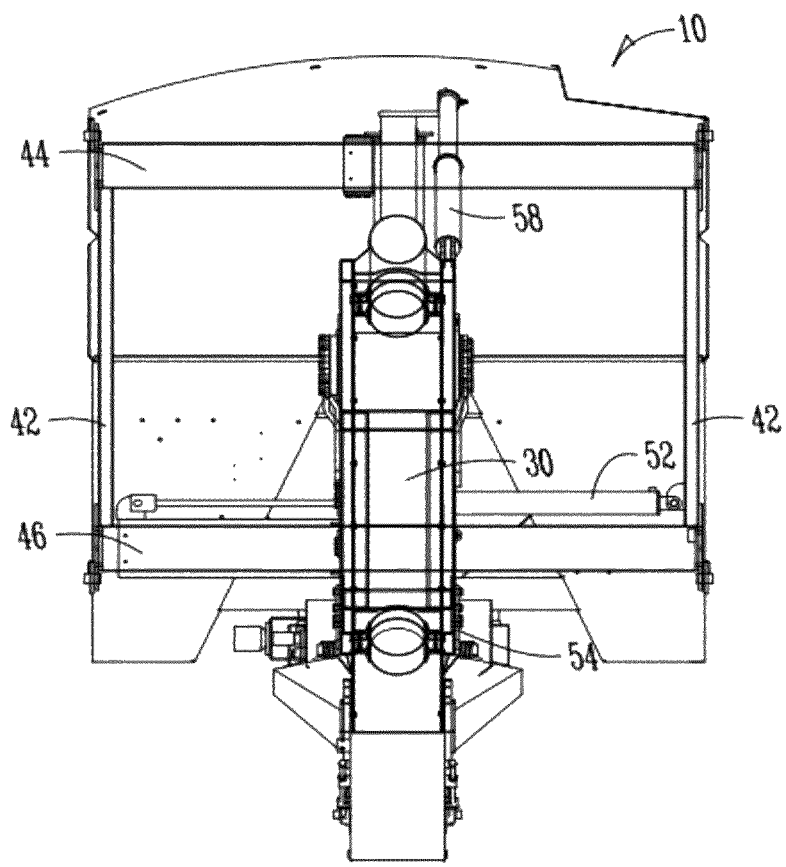
FIG. 12 is a rear end view of the seed cart shown in FIG. 10.
Figure 13:
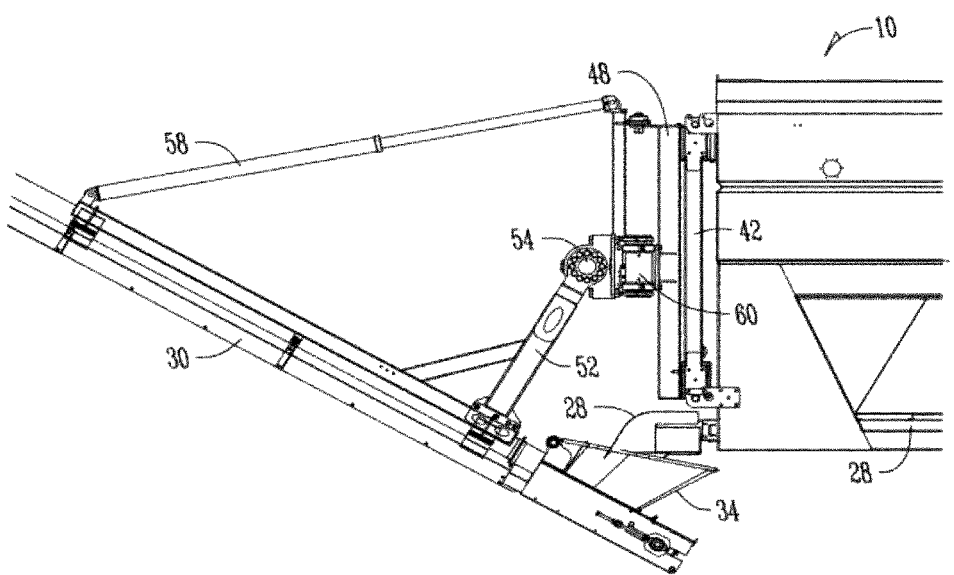
FIG. 13 is a side elevation view of the seed cart shown in FIG. 10.
Figure 14:
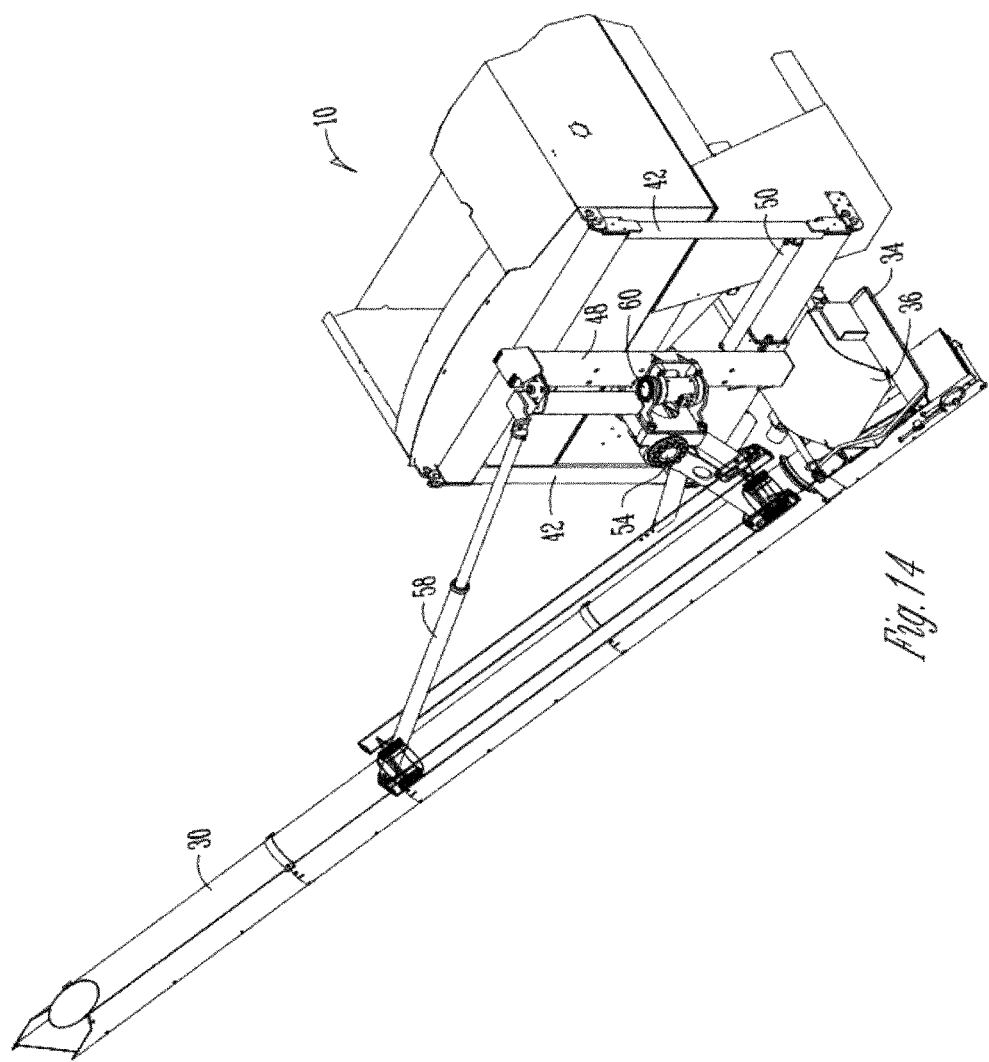
FIG. 14 is a perspective view of the seed cart with the conveyor in the use position and swung to the left side of the cart.
Figure 15:
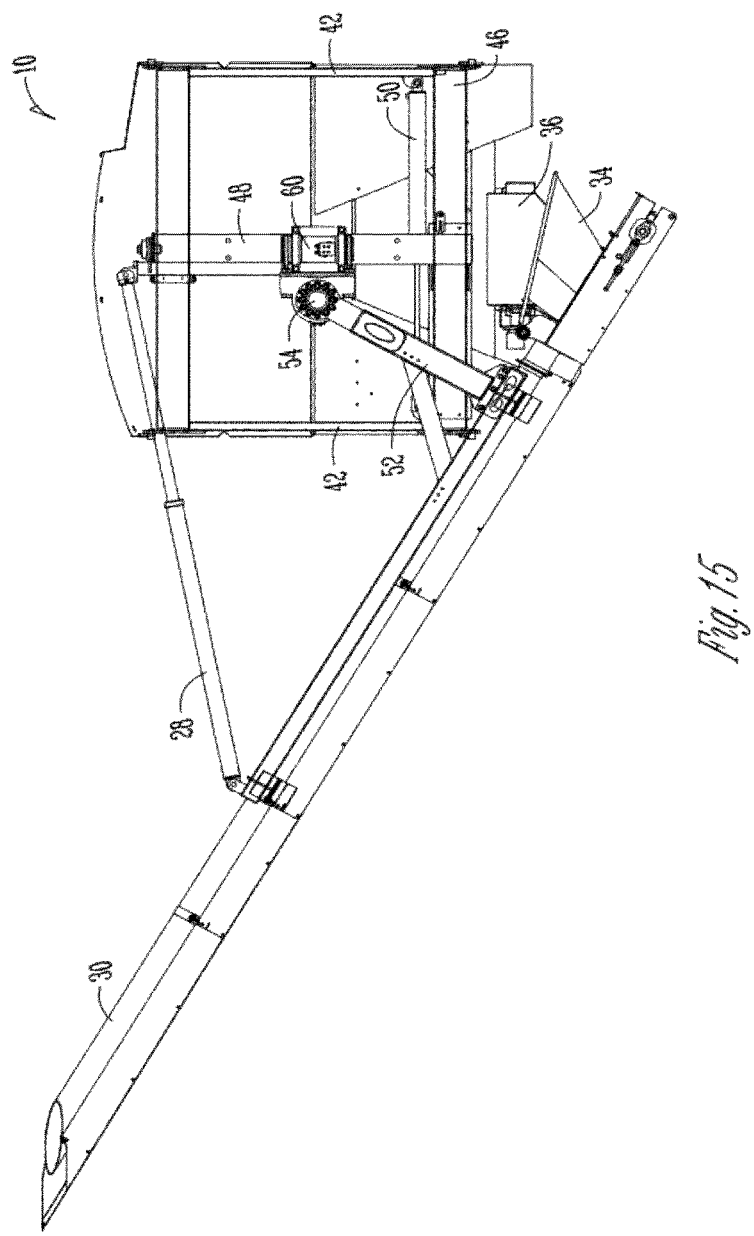
FIG. 15 is a plan view of the cart shown in FIG. 14.
Figure 16:
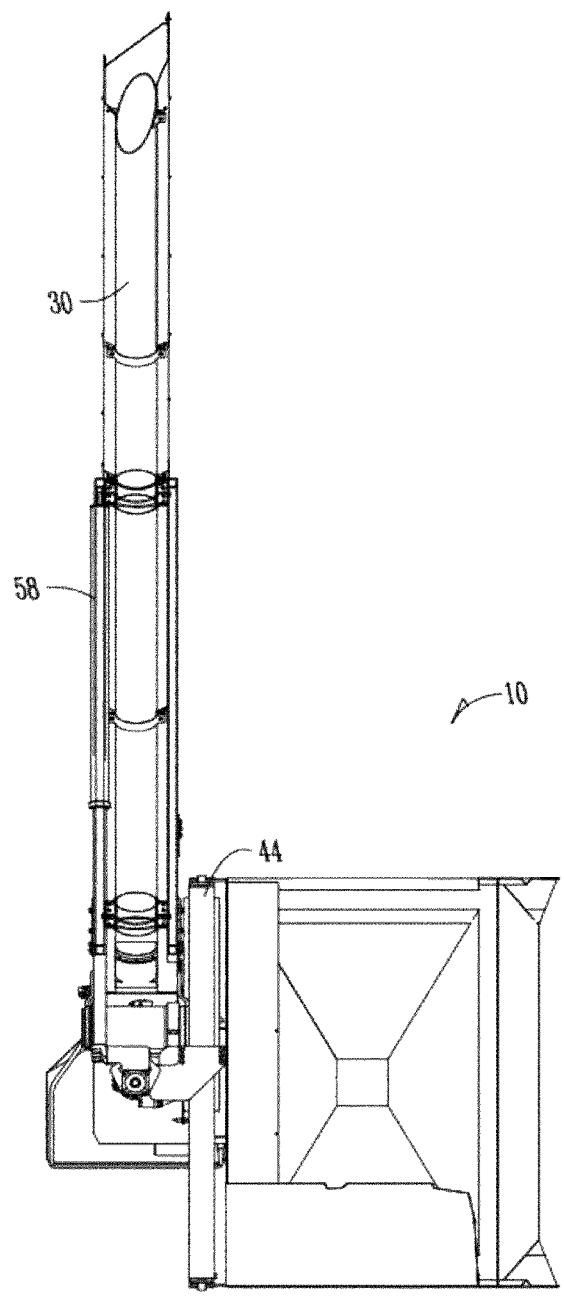
FIG. 16 is a rear end view of the cart shown in FIG. 14.
Figure 17:
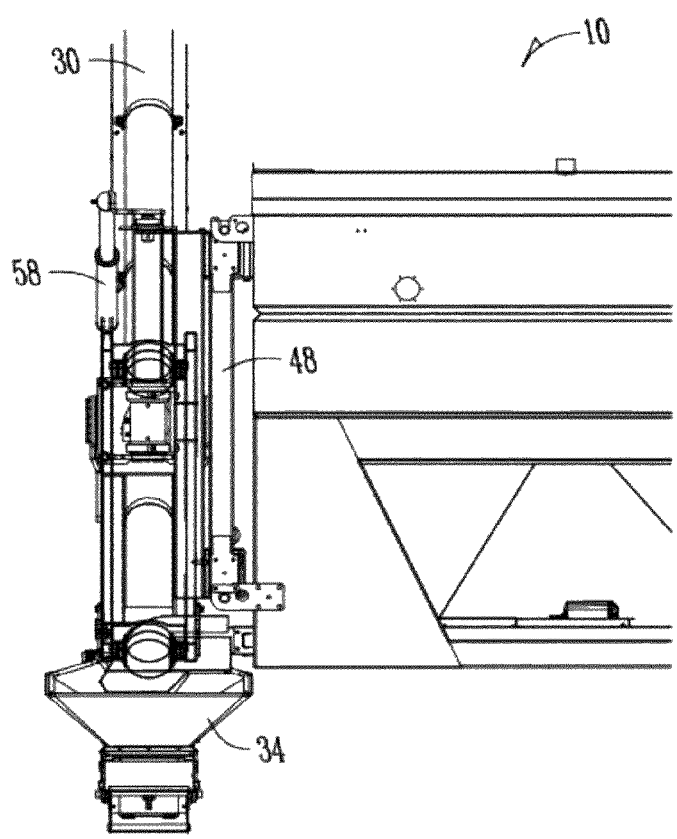
FIG. 17 is a side elevation view of the cart shown in FIG. 14.
Figure 18:
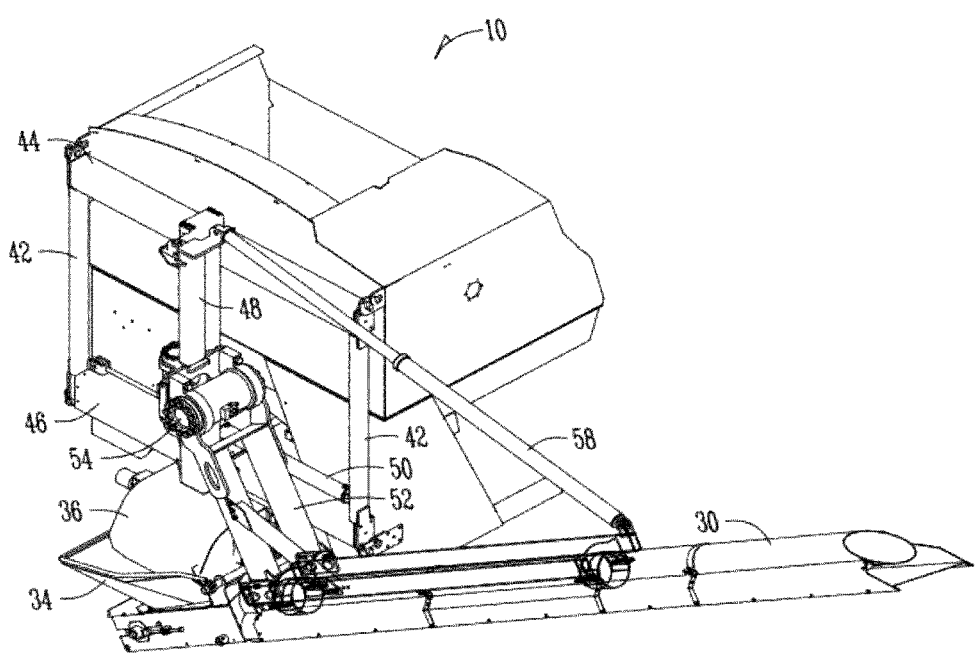
FIG. 18 is a view similar to FIG. 14 with the conveyor swing to the right side of the cart.
Figure 19:
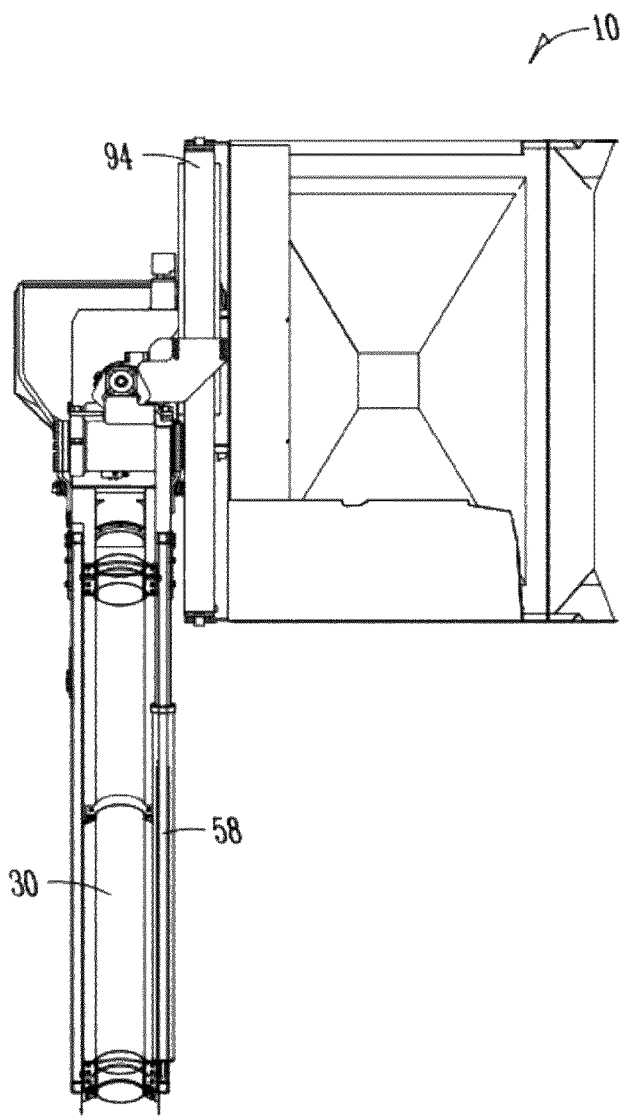
FIG. 19 is a plan view of the seed cart shown in FIG. 18.
Figure 20:
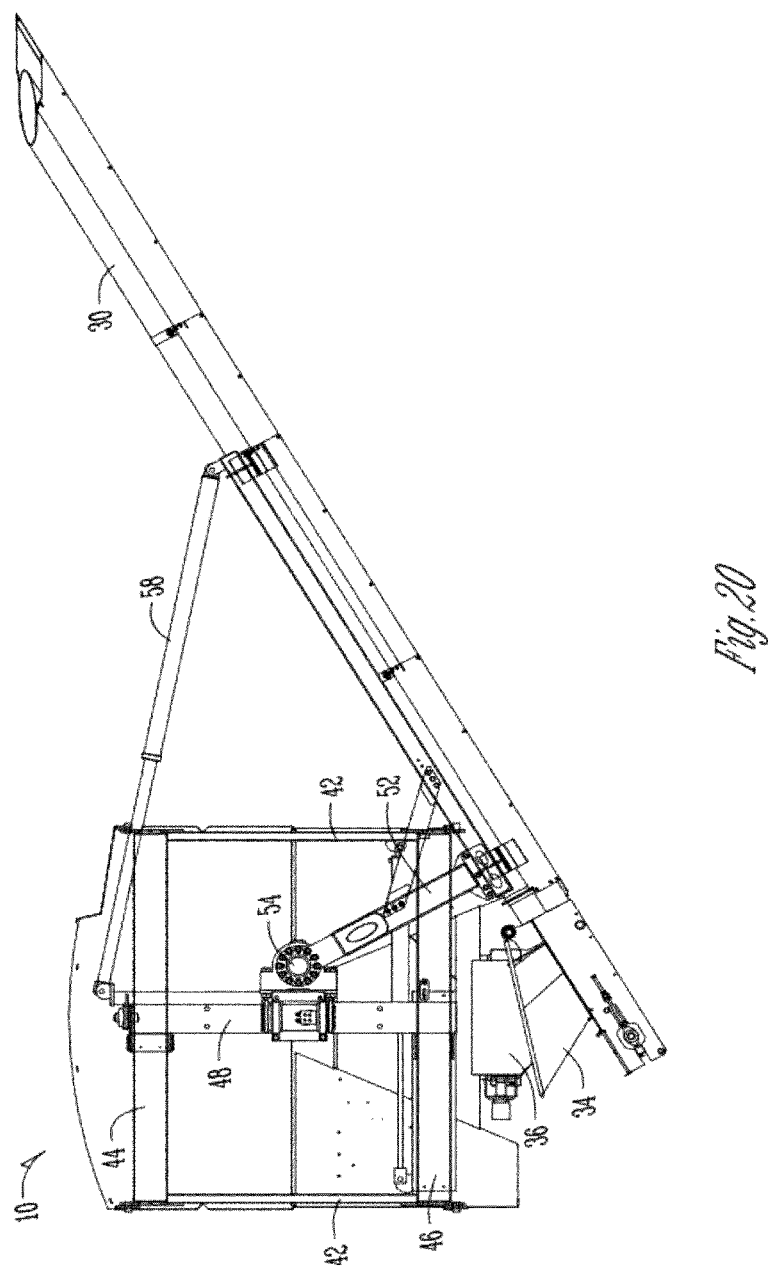
FIG. 20 is a rear end view of the seed cart shown in FIG. 18.
Figure 21:
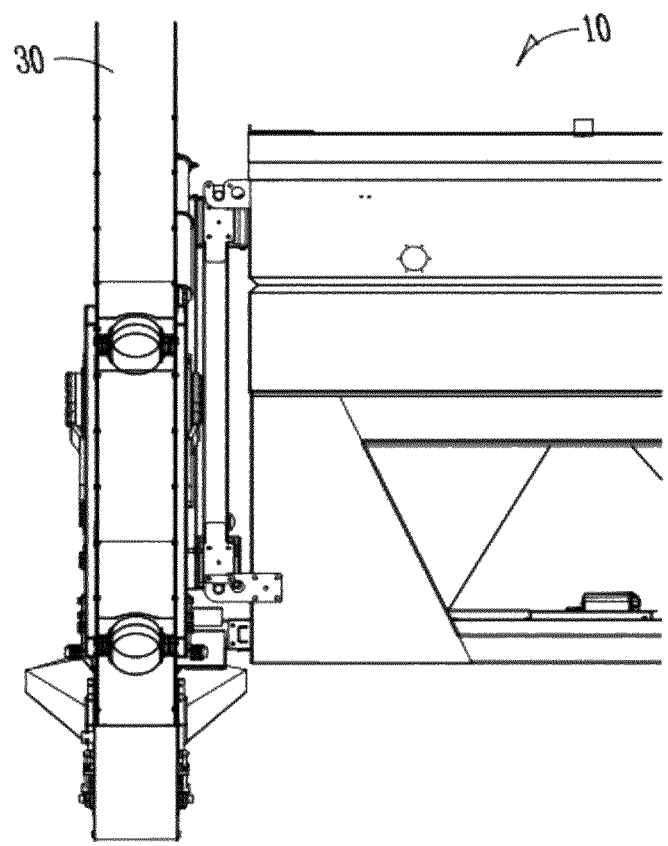
FIG. 21 is a side elevation view of the seed cart shown in FIG. 18.

The cart 10 is also provided with an upper conveyor 30 and a manipulator 32 which selectively moves the conveyor 30 between a transport or storage position shown in FIG. 1 and various use positions shown in FIGS. 10, 14 and 18. The conveyor 30 includes an inlet hopper 34 which is positioned beneath the outlet 36 of the lower conveyor 28 when the upper conveyor 30 is in a use position. The upper conveyor 30 also has an outlet 38 which can be manipulated relative to the cart 10 by the manipulator 32, as described below.

In the figures, the conveyors 28 and 30 are shown to be belt-type conveyors, though auger conveyors and other conveyor types may be used with the manipulator 32 of the present invention.

The manipulator 32 includes a frame 40 fixed on the rear end 18 of the cart 10. The frame 40 includes opposite side rails 42, and opposite upper and lower rails 44, 46, respectively. A slide frame 48 is mounted on the upper and lower rails 44, 46 of the main frame 40 for sliding lateral movement between the opposite side rails 42 of the main frame 40. Movement of the slide frame 48 relative to the main frame 40 is controlled by an actuator, such as a hydraulic cylinder 50.

The manipulator 32 also includes a support arm 52 mounted to the slide frame 48 for pivotal movement about a horizontal axis. A rotary actuator 54 is provided at the lower end of the arm 52 to pivot the arm 52 approximately 150° between the upright storage position (FIGS. 1-5) and the lowered use position (FIGS. 10-21). The actuator 54 controls the pivotal movement of the support arm 52 about the horizontal axis, and relative to the slide frame 48. A conveyor cradle 56 extends from the upper end of the support arm 52 to support the conveyor 30. A hydraulic cylinder 58 stabilizes the cradle 56 and conveyor 30.

The manipulator 32 further includes a rotary actuator 60 which swings the support arm 52, the cradle 56 and the conveyor 30 about a vertical axis so as to move the conveyor or outlet 38 to any desired position ranging approximately 180° behind the cart 10, as seen in Figures 14-21.

In use, the slide actuator 50 slides the conveyor 30 between one side of the cart 10 and the longitudinal center line of the cart 10 where the inlet hopper 34 is aligned with the outlet 36 of the lower conveyor 28. The rotary actuator 54 folds the conveyor 30 between the transport position above the cart 10 and the use positions behind the cart 10. Then, the rotary actuator 60 can swing the conveyor 30 so as to extend beyond either side 20, 22 of the cart 10, if desired. All the movements of the conveyor 30 are preferably controlled with a remote control unit.

It is understood that the manipulator 32 can be used on various seed carts and with various conveyors. The location of the manipulator 32 on the rear end 18 of the cart 10 allows the conveyor 30 to be swung approximately 180° to either side of the conveyor, as desired, for discharging seed from the cart 10 through the conveyor 30. The lateral movement of the conveyor 30 along the upper and lower rails 44, 46 of the manipulator frame 40 allows the conveyor 30 to be stored along the top 12 of the cart 10 and along one side of the cart, such that seed can be loaded into the cart 10 without interference from the conveyor 30, while the conveyor 30 is in the storage position.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved seed cart having a top, a bottom, opposite front and rear ends defining a longitudinal axis, opposite sides, and a seed discharge opening, the improvement comprising:
   a first conveyor extending beneath the cart to receive seed from the discharge opening and transport seed to the rear end of the cart;
   a second conveyor pivotally movable between a horizontal transport position residing longitudinally along and over the top of the cart and a use position adjacent the first conveyor to receive seed from the first conveyor; and
   a manipulator attached to the rear end of the cart and adapted to move the second conveyor between positions.

2. The improved seed cart of claim 1, wherein the second conveyor pivots about a horizontal axis between the transport and use positions.

3. The improved seed cart of claim 2, wherein the second conveyor pivots approximately 150° between the transport and use positions.

4. The improved seed cart of claim 1, wherein in the use position, the second conveyor pivots about a vertical axis so as to extend beyond either side of the cart.

5. The improved seed cart of claim 4, wherein the second conveyor pivots at least 120° about the vertical axis.

6. The improved seed cart of claim 1, wherein the second conveyor slides from a first position adjacent one side of the cart and a second position centered on the longitudinal axis of the cart.

7. The improved seed cart of claim 1, wherein the manipulator includes an actuator to slide the second conveyor across the rear end of the cart between the opposite sides of the cart.

8. The improved seed cart of claim 1, wherein the manipulator includes an arm attached to the second conveyor and a first actuator to pivot the conveyor about a horizontal axis between the transport and use positions.

9. The improved seed cart of claim 8, wherein the manipulator includes a second actuator to pivot the second conveyor about a vertical axis so as to swing beyond both opposite sides of the cart.

10. The improved seed cart of claim 1, wherein the manipulator pivots the second conveyor about horizontal and vertical axes.

11. The improved seed cart of claim 1, wherein the second conveyor has opposite inlet and outlet ends and is free from joints between the ends.

12. The improved seed cart of claim 1, wherein the second conveyor has opposite inlet and outlet ends, and both ends move together during movement of the second conveyor between the transport and use positions.

13. A manipulator for a conveyor of a seed tender, the seed tender having a seed discharge and the conveyor having an inlet positionable beneath the seed discharge, the conveyor being mounted on a rear end of the seed tender, the manipulator comprising:
   a main frame residing in a vertical plane on the back of the seed tender and having horizontal upper and lower rails;

a slide frame slidably mounted on the rails of the main frame for horizontal movement along the rails;

a support arm on the slide frame to support the conveyor;

a first actuator for moving the slide frame, support arm and conveyor horizontally relative to the sides of the seed tender;

a second actuator to pivot the support arm and conveyor about a horizontal axis between a forwardly extending transport position above the seed tender and a use position behind the seed tender; and a third actuator to pivot the support arm and conveyor side-to-side about a vertical axis when in the use position.

14. The manipulator of claim 13, wherein the conveyor pivots at least 120° about the vertical axis.

15. The manipulator of claim 13, wherein the conveyor pivots approximately 150° about the horizontal axis between the transport and use positions.

16. The manipulator of claim 13, wherein the conveyor has opposite inlet and outlet ends and does not fold between the ends.

17. A manipulator for moving a conveyor of a seed cart having a front end, a rear end, and opposite sides, the conveyor having an inlet and an outlet, and the manipulator comprising:

a main frame extending vertically on the rear end of the cart and being connected to the conveyor;

a first actuator to pivot the conveyor about a horizontal axis between a horizontal storage position wherein the conveyor inlet and outlet both reside above the seed cart, and a use positions to discharge seed from the cart; and a second actuator to pivot the conveyor about a vertical axis to move the conveyor to opposite sides of the cart for alternative use positions.

18. The manipulator of claim 17, further comprising a slide frame slidably mounted on the top and bottom of the main frame, and a linear actuator to slide the slide frame laterally along the top and bottom and between the opposite sides of the main frame, and the conveyor being mounted on the slide frame so as to be slidably movable between the opposite sides of the cart.

19. The manipulator of claim 18, wherein the linear actuator slides the conveyor to one side of the cart for the storage position and slides the conveyor to a longitudinal axis of the cart for the use position.

20. The manipulator of claim 17, wherein the second actuator pivots the conveyor at least 120°.

21. The manipulator of claim 17, further comprising a slide frame slidably mounted on the main frame, and an arm extending between the slide frame and the conveyor.

22. The manipulator of claim 17, wherein the main frame having opposite sides a top and a bottom, and the sides, the top and the bottom defining a vertical plane.

* * * * *